(12) United States Patent
Morales et al.

(10) Patent No.: US 11,673,675 B2
(45) Date of Patent: Jun. 13, 2023

(54) ASPIRATOR AIR VENT VALVE

(71) Applicant: GOODRICH CORPORATION, Charlotte, NC (US)

(72) Inventors: José Morales, Chandler, AZ (US); Michael A. Luzader, Laveen, AZ (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 17/480,663

(22) Filed: Sep. 21, 2021

(65) Prior Publication Data

US 2022/0001995 A1 Jan. 6, 2022

Related U.S. Application Data

(62) Division of application No. 16/165,807, filed on Oct. 19, 2018, now Pat. No. 11,148,818.

(51) Int. Cl.
| | |
|---|---|
| *B64D 25/14* | (2006.01) |
| *B64D 25/18* | (2006.01) |
| *F04F 5/16* | (2006.01) |
| *F04F 5/46* | (2006.01) |
| *F04F 5/48* | (2006.01) |
| *F16K 15/06* | (2006.01) |
| *A62B 1/20* | (2006.01) |

(Continued)

(52) U.S. Cl.
CPC .............. *B64D 25/14* (2013.01); *B64D 25/18* (2013.01); *F04F 5/16* (2013.01); *F04F 5/46* (2013.01); *F04F 5/48* (2013.01); *A62B 1/20* (2013.01); *F04B 39/102* (2013.01); *F16K 15/063* (2013.01); *F16K 17/042* (2013.01)

(58) Field of Classification Search
CPC ....... F04F 5/16; F04F 5/42; F04F 5/46; A62B 1/20; F16K 15/063; F16K 17/042
See application file for complete search history.

(56) References Cited

U.S. PATENT DOCUMENTS

| | | |
|---|---|---|
| 3,040,772 A | 6/1962 | William |
| 3,409,037 A | 11/1968 | Nelson |

(Continued)

OTHER PUBLICATIONS

DPM, Split seal ring innovation 2017—News_pdf from archive. org—web.archive.org/web/20180822181647/http://www.dpm-seal. com/i-News-1017687/Split-seal-ring-innovation-2017-1022554. html, taken as a snapshot on Aug. 22, 2018 from dpm-seal.com/i-News-1017687/Split-seal-ring-innovation-2017-1022554.html (Year: 2018), pp. 1.

(Continued)

*Primary Examiner* — Kenneth J Hansen
*Assistant Examiner* — David N Brandt
(74) *Attorney, Agent, or Firm* — Snell & Wilmer L.L.P.

(57) ABSTRACT

An aspirator air vent valve may include an air vent valve body coupled with an aspirator body and a pipe fitting. The air vent valve body may include an air vent valve air channel defined by an inner wall of the air vent valve body and disposed between the aspirator body and the pipe fitting. The aspirator air vent valve may further include a vent passage defined by a first vent wall and a second vent wall and disposed between an outer wall and the inner wall of the air vent valve body, wherein the vent passage is in fluid communication with the air vent valve air channel. The aspirator air vent valve may further include a plunger coupled with the air vent valve body.

4 Claims, 9 Drawing Sheets

(51) Int. Cl.
*F04B 39/10* (2006.01)
*F16K 17/04* (2006.01)

(56) References Cited

U.S. PATENT DOCUMENTS

| | | | | |
|---|---|---|---|---|
| 3,771,913 | A * | 11/1973 | MacPherson | F04F 5/466 |
| | | | | 417/191 |
| 5,002,465 | A * | 3/1991 | Lagen | F04F 5/468 |
| | | | | 417/181 |
| 5,067,511 | A | 11/1991 | Taylor | |
| 6,071,084 | A * | 6/2000 | Wass | F04F 5/463 |
| | | | | 417/189 |
| 6,240,951 | B1 | 6/2001 | Yori | |
| 6,659,404 | B1 | 12/2003 | Roemke | |
| 9,599,243 | B1 | 3/2017 | Taylor | |
| 10,578,223 | B2 * | 3/2020 | Andreas | F16K 17/082 |
| 2015/0122353 | A1* | 5/2015 | Chiba | F04B 39/10 |
| | | | | 137/535 |
| 2017/0016459 | A1* | 1/2017 | Ruegsegger | F04F 5/48 |
| 2018/0141669 | A1 | 5/2018 | Ruegsegger et al. | |

OTHER PUBLICATIONS

USPTO, Restriction/Election Requirement dated Nov. 19, 2020 in U.S. Appl. No. 16/165,807.
USPTO, Preinterview First Office Action dated Feb. 11, 2021 in U.S. Appl. No. 16/165,807.
USPTO, First Action Interview Office Action dated Mar. 30, 2021 in U.S. Appl. No. 16/165,807.
USPTO, Notice of Allowance dated Jun. 16, 2021 in U.S. Appl. No. 16/165,807.

* cited by examiner

ASPIRATOR AIR VENT VALVE

CROSS-REFERENCE TO RELATED APPLICATIONS

This application is a divisional of, and claims priority to and the benefit of, U.S. application Ser. No. 16/165,807, filed Oct. 19, 2018 and entitled "ASPIRATOR AIR VENT VALVE," which is incorporated by reference herein in its entirety for all purposes.

FIELD

The present disclosure is directed to evacuation systems for use in aircraft and, more particularly, to aspirators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the charged gas cylinder, combines gas from the atmosphere and the fluid to provide gas for inflating the emergency evacuation devices. Aspirators are typically stored in a limited packing space with the evacuation slide within a small space in the aircraft. Increasing pressurization of the inflatable due to pressure difference conditions should be prevented.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

In various embodiments, an aspirator air vent valve is provided. The aspirator air vent valve may include an air vent valve body coupled with an aspirator body and a pipe fitting. The air vent valve body may include an air vent valve air channel defined by an inner wall of the air vent valve body and disposed between the aspirator body and the pipe fitting. The aspirator air vent valve may further include a vent passage defined by a first vent wall and a second vent wall and disposed between an outer wall and the inner wall of the air vent valve body, wherein the vent passage is in fluid communication with the air vent valve air channel. The aspirator air vent valve may further include a plunger coupled with the air vent valve body. A proximal side of a head of the plunger may be coupled with the inner wall of the air vent valve body. The proximal side of the head of the plunger may be coupled to a first sealing gasket and a second sealing gasket. The aspirator air vent valve may include a detent pin coupled with the air vent valve body, wherein the detent pin engages an indent in the plunger. The air vent valve body may be coupled with the aspirator via an aspirator body fitting. The aspirator may be coupled with an inflatable evacuation device. The vent passage may be in fluid communication with the inflatable evacuation device.

In various embodiments, an aircraft having an evacuation system is provided. The aircraft may include an inflatable evacuation device configured to pack within the aircraft and an aspirator coupled to the compressed fluid source and to the inflatable evacuation device. The aspirator may include an air vent valve body coupled with the aspirator body and a pipe fitting, the air vent valve body including an air vent valve air channel defined by an inner wall of the air vent valve body and disposed between the aspirator body and the pipe fitting. The aspirator air vent valve may include a vent passage defined by a first vent wall and a second vent wall and disposed between an outer wall and the inner wall of the air vent valve body. The vent passage may be in fluid communication with the air vent valve air channel. The aspirator air vent valve may include a plunger coupled with the air vent valve body. A proximal side of a head of the plunger may be coupled with an inner wall of the air vent valve body. The proximal side of the head of the plunger may be coupled to a first sealing gasket and a second sealing gasket. The aspirator air vent valve may include a detent pin coupled with the air vent valve body, wherein the detent pin engages an indent in the plunger. The air vent valve body may be coupled with the aspirator via an aspirator body fitting.

In various embodiments, a method of operating an aspirator is provided. The method may include exerting a first force on a plunger of an aspirator air vent valve of the aspirator to direct the plunger towards a proximal inner wall of the aspirator air vent valve. The method may include directing a fluid from a compressed fluid source through the aspirator into an inflatable evacuation device. The method may include directing an ambient gas through an aspirator body into the inflatable evacuation device. The method may include engaging the plunger with the proximal inner wall of the aspirator air vent valve. The method may include exerting a second force on the plunger to direct the plunger towards a proximal side of a pipe fitting. The method may include directing at least one of the fluid or the ambient gas from the inflatable evacuation device through a vent passage of the aspirator air vent valve.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "distal" refers to the direction toward the positive z-direction on the provided xyz axes relative to aspirator 114. As used herein, "proximal" refers to a direction toward the negative z-direction on the provided xyz axes relative to aspirator 114.

Figure 1:
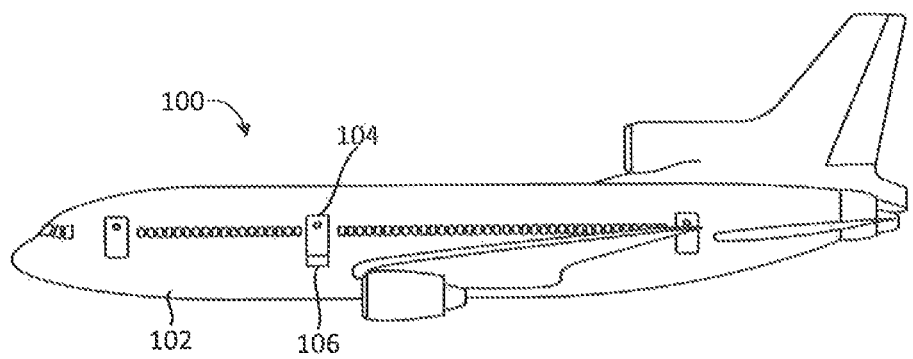
FIG. 1 illustrates a perspective view of an aircraft having an evacuation system, in accordance with various embodiments.

Referring to FIG. 1, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 2:
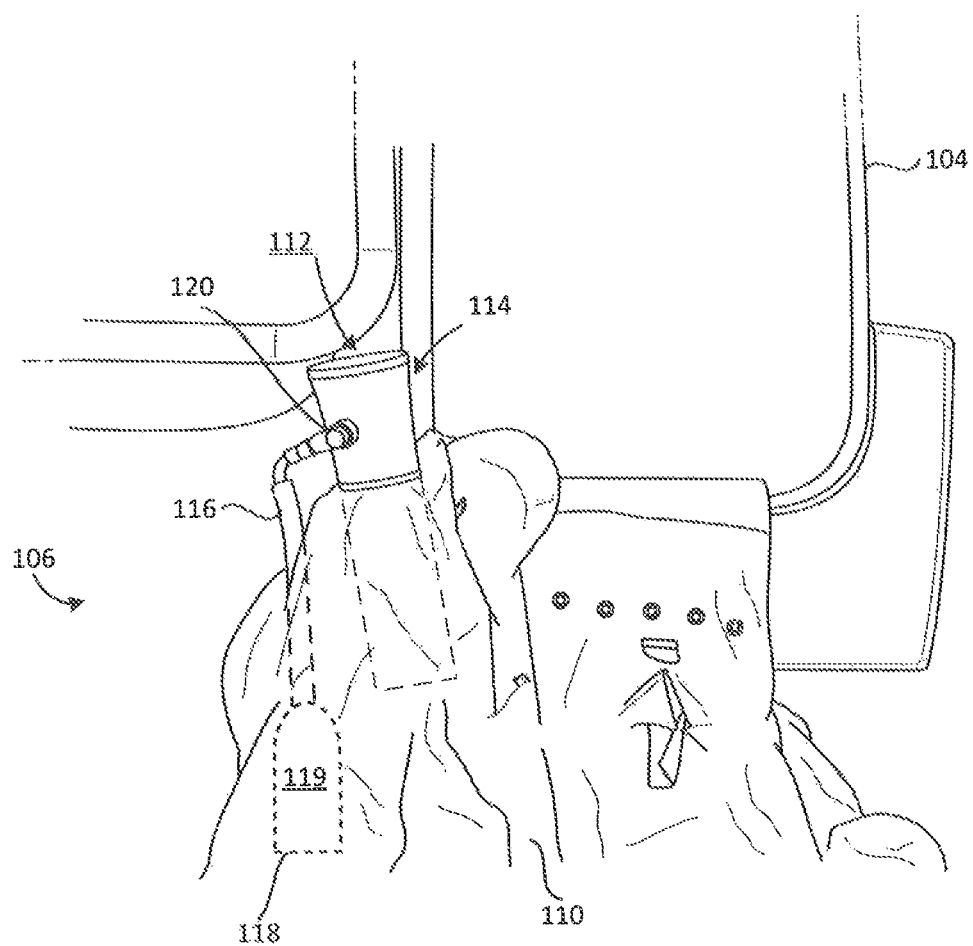
FIG. 2 illustrates an evacuation system, in accordance with various embodiments.

Referring to FIGS. 1 and 2, evacuation system 106 includes an inflatable evacuation device 110. Evacuation system 106 further includes ambient gas 112. The ambient gas 112 may enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, and referring to FIG. 2, the aspirator 114 may be coupled to the inflatable evacuation device 110 and compressed fluid source 118. Aspirator 114 may be coupled to compressed fluid source 118 via pipe assembly 116. Pipe assembly 116 may be coupled to the aspirator 114 via an aspirator air vent valve 120. During normal flight conditions, the inflatable evacuation device 110 may be deflated and stored within a compartment of aircraft 100. In various embodiments, inflatable evacuation device 110 and aspirator 114 may be stored in a single package within the aircraft compartment. When inflatable evacuation device 110 is not in use, it may be deflated when packed. Inflatable evacuation device 110 will stay deflated and withstand changes in pressure in the aircraft. In various embodiments, a vent feature is provided aspirator 114 to equalize the pressure within inflatable evacuation device 110 to the ambient air.

Figure 4:
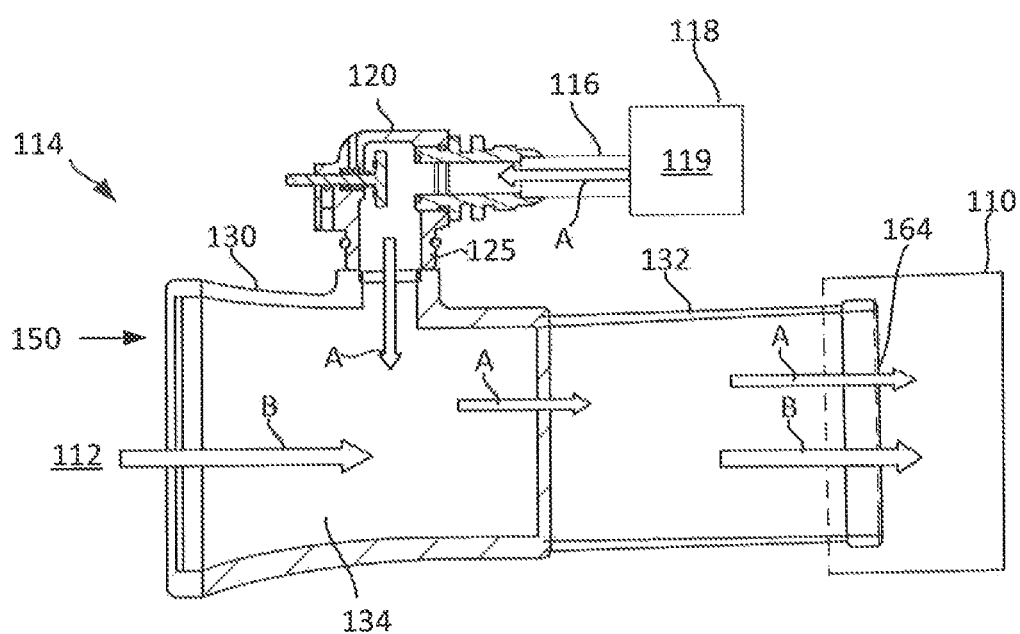
FIG. 4 illustrates a cross-sectional view of an aspirator, in accordance with various embodiments

With reference to FIG. 4, in response to deployment of the evacuation system 106, fluid 119 may flow from compressed fluid source 118 into aspirator 114 via airflow path A. In response to fluid 119 moving from the compressed fluid source 118 to air channel 134 via aspirator air vent valve 120, ambient gas 112 from the environment surrounding the aspirator 114 is compelled into air channel 134 from outside the aspirator 114 via airflow path B. Stated differently, aspirator 114 facilitates intake of ambient gas 112 from the environment, which enters air channel 134 via airflow path B. The fluid 119 and the ambient gas 112 may be directed into the inflatable evacuation device 110. In response to receiving the fluid 119 and the ambient gas 112, inflatable evacuation device 110 may begin to inflate.

Figure 3:
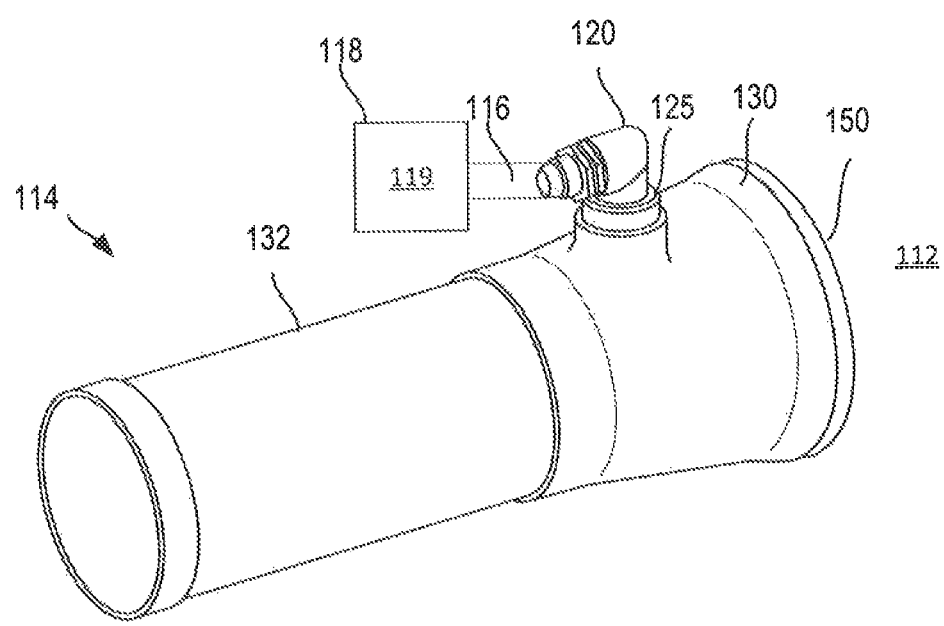
FIG. 3 illustrates an aspirator for an inflatable evacuation device, in accordance with various embodiments.

With reference to FIGS. 3 and 4, aspirator 114 may include an aspirator body 130 coupled to an aspirator barrel 132. With reference to FIG. 4, aspirator body 130 may define an air channel 134, which may be a chamber of aspirator 114. Aspirator 114 may include an aspirator air vent valve 120 in fluid communication with air channel 134. Aspirator air vent valve 120 may direct fluid 119 from compressed fluid source 118, such as a charged cylinder, through pipe assembly 116 and into air channel 134 via airflow path A. Outlet 164 of aspirator barrel 132 may extend into inflatable evacuation device 110. Fluid 119 and the ambient gas 112 may therefore flow through aspirator barrel 132, exit into inflatable evacuation device 110.

With reference to FIGS. 5A-5D, aspirator air vent valve 120 is shown, in accordance with various embodiments. Aspirator air vent valve 120 may comprise air vent valve body 122. Air vent valve body 122 may be coupled to pipe fitting 124 and aspirator body 130 (as shown in FIGS. 3 and 4). Air vent valve body 122 may be coupled with aspirator body 130 via aspirator body fitting 125. Pipe fitting 124 may also be coupled to pipe assembly 116. Air vent valve body 122 may define air vent valve air channel 123. Air vent valve air channel 123 may be defined by an inner wall 128 of the air vent valve body 122 and disposed between the aspirator body 130 and the pipe fitting 124. Aspirator air vent valve 120 may comprise plunger 140, vent passage 150 and detent pin 160. Plunger 140 may comprise a t-shape and comprise head 142 and body 144. Plunger 140 may be coupled with air vent valve body 122. Spring 170 may be disposed around at least a portion of body 144 of plunger 140.

Figure 5A:
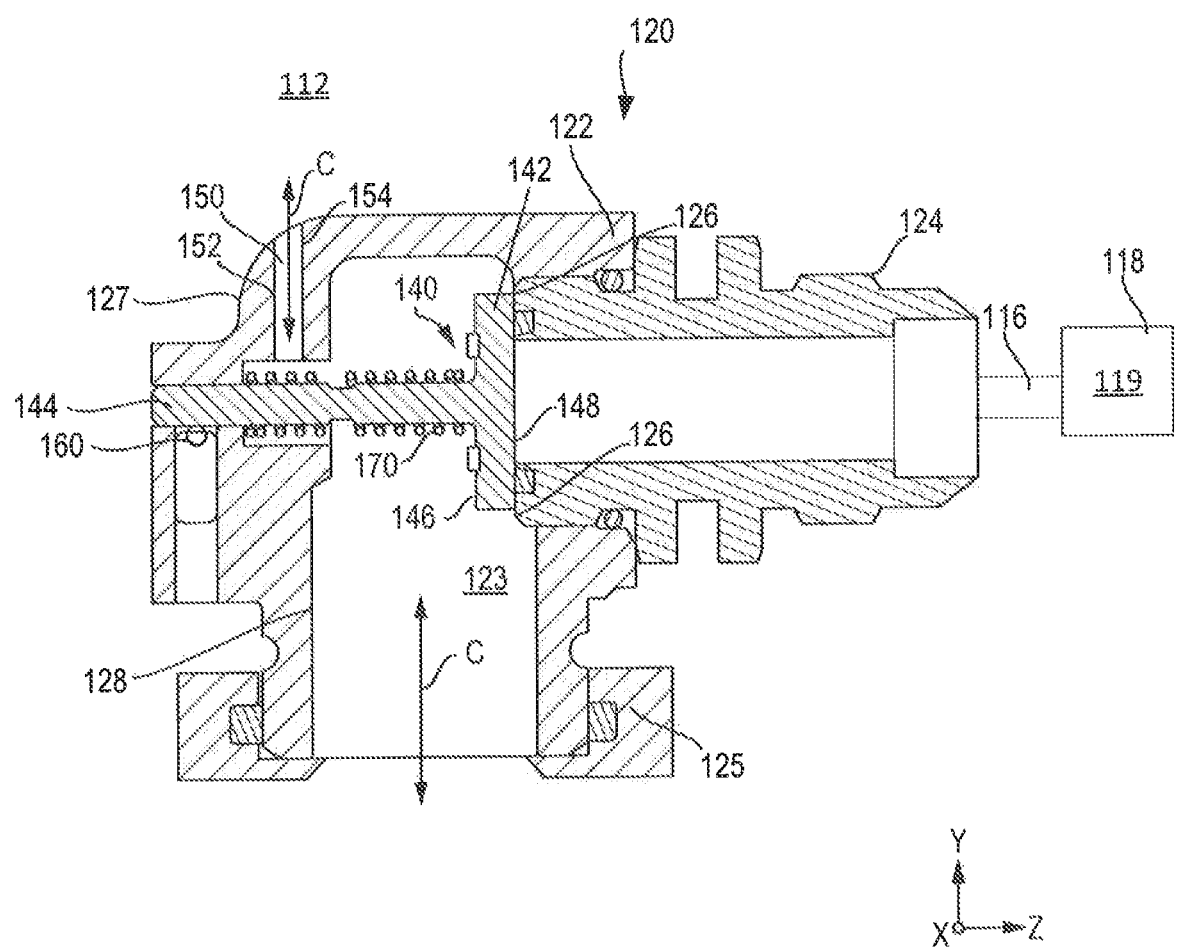
FIG. 5A illustrates a cross-sectional view of an aspirator air vent valve, in accordance with various embodiments.

With reference to FIG. 5A, aspirator air vent valve 120 is shown in conditions when inflatable evacuation device 110 may be deflated and stored within a compartment of aircraft 100 (hereafter, a "deflated state"). In the deflated state, body 144 may be coupled to proximal side 146 of head 142. In the deflated state, distal side 148 of head 142 may couple with at least one of proximal side 126 of pipe fitting 124 or inner wall 128 of air vent valve body 122.

Air vent valve body 122 may comprise vent passage 150 disposed between outer wall 127 and inner wall 128 of air vent valve body 122. Vent passage 150 may be defined at least partially by first vent wall 152 and second vent wall 154. As shown in FIG. 5A, in the deflated state, vent passage 150 may be in fluid communication with ambient gas 112 and air vent valve air channel 123. In the deflated state, vent passage 150 may therefore be in fluid communication with inflatable evacuation device 110 (shown in FIGS. 2 and 4). Ambient gas 112 may freely flow through vent passage 150 via airflow path C and allow for the pressure to be the same between the ambient gas 112 in the outside environment and inflatable evacuation device 110.

Figure 5B:
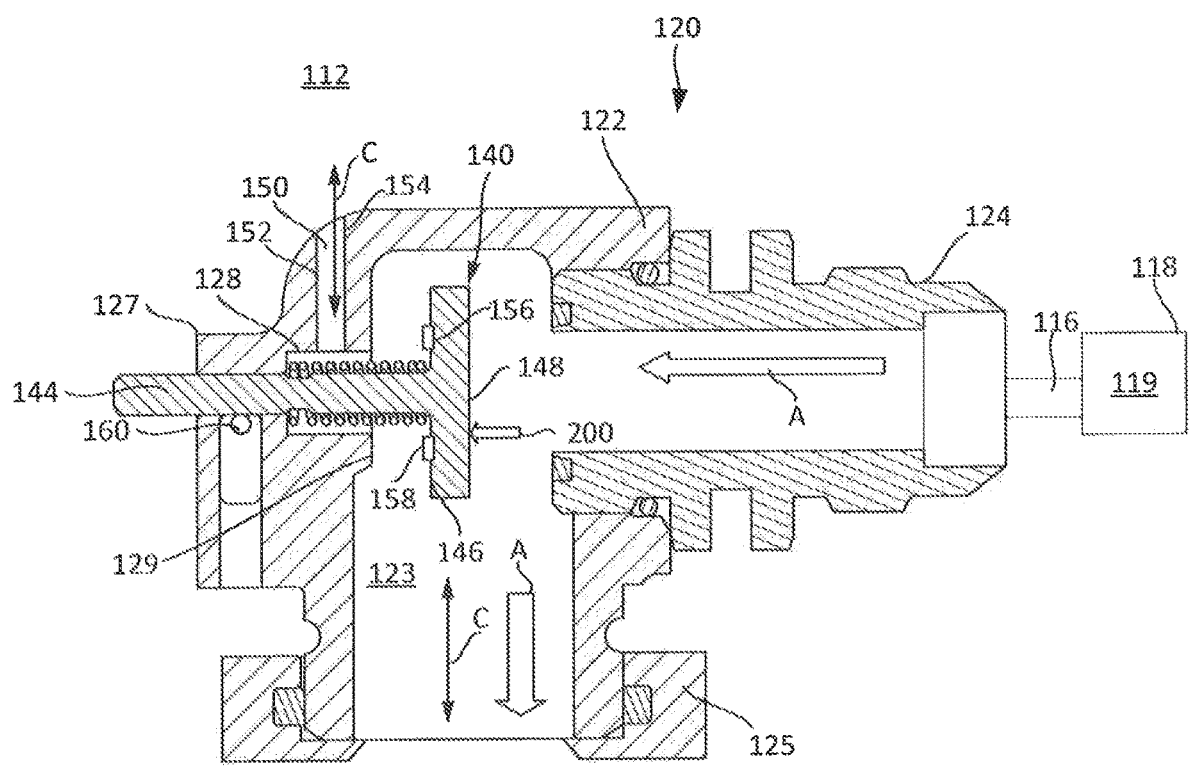
FIG. 5B illustrates a cross-sectional view of an aspirator air vent valve, in accordance with various embodiments.
Figure 5C:
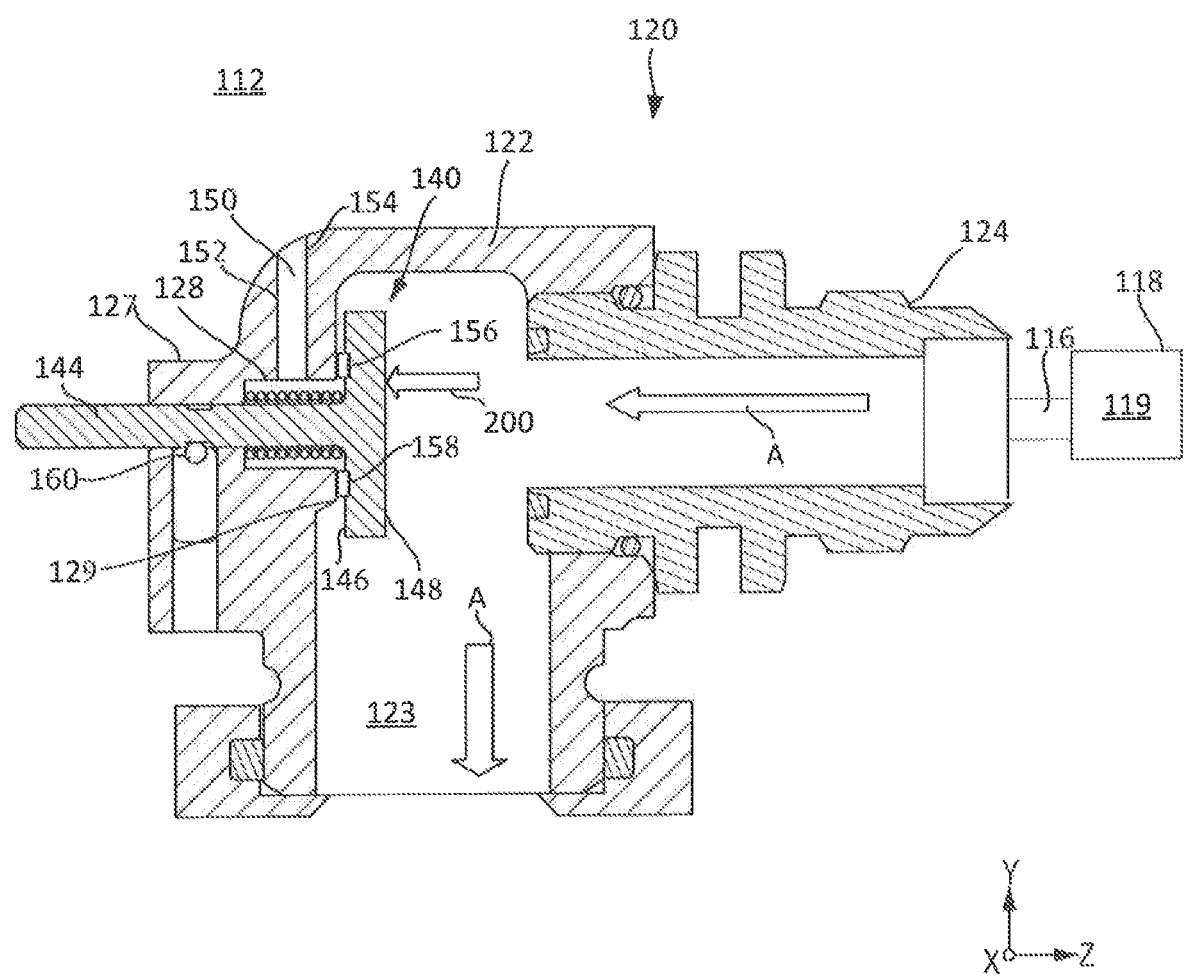
FIG. 5C illustrates a cross-sectional view of an aspirator air vent valve, in accordance with various embodiments.

As shown in FIG. 5B-5C, in response to deployment of the evacuation system 106 (hereafter, the "deployed state"), fluid 119 may flow from compressed fluid source 118 into aspirator 114 via airflow path A, at a relatively high velocity. Fluid 119 may exert a first force 200 on plunger 140 and may drive plunger 140 toward the negative z-direction on the provided xyz axes relative to air vent valve body 122. First force 200 may drive distal side 148 of head 142 of plunger 140 toward proximal inner wall 129. Body 144 of plunger 140 may at least partially extend past outer wall 127 of air vent valve body 122.

As shown in FIG. 5C, proximal side 146 of head 142 of plunger 140 may engage with proximal inner wall 129 of aspirator air vent valve 120. In various embodiments, proximal side 146 of plunger 140 may act as a seal and prevent flow of fluid 119 or ambient gas 112 through vent passage 150. Proximal side 146 of head 142 may comprise a first sealing gasket 156 and a second sealing gasket 158. In various embodiments, first sealing gasket 156 and a second sealing gasket 158 may couple with proximal inner wall 129 and act as a seal to prevent movement of fluid 119 or ambient gas 112 through vent passage 150.

In various embodiments, aspirator air vent valve 120 may comprise detent pin 160. In various embodiments, plunger 140 may comprise indent 162 configured to receive detent pin 160. Specifically, in the deployed state, indent 162 may receive detent pin 160 and hold plunger 140 in place.

Figure 5D:
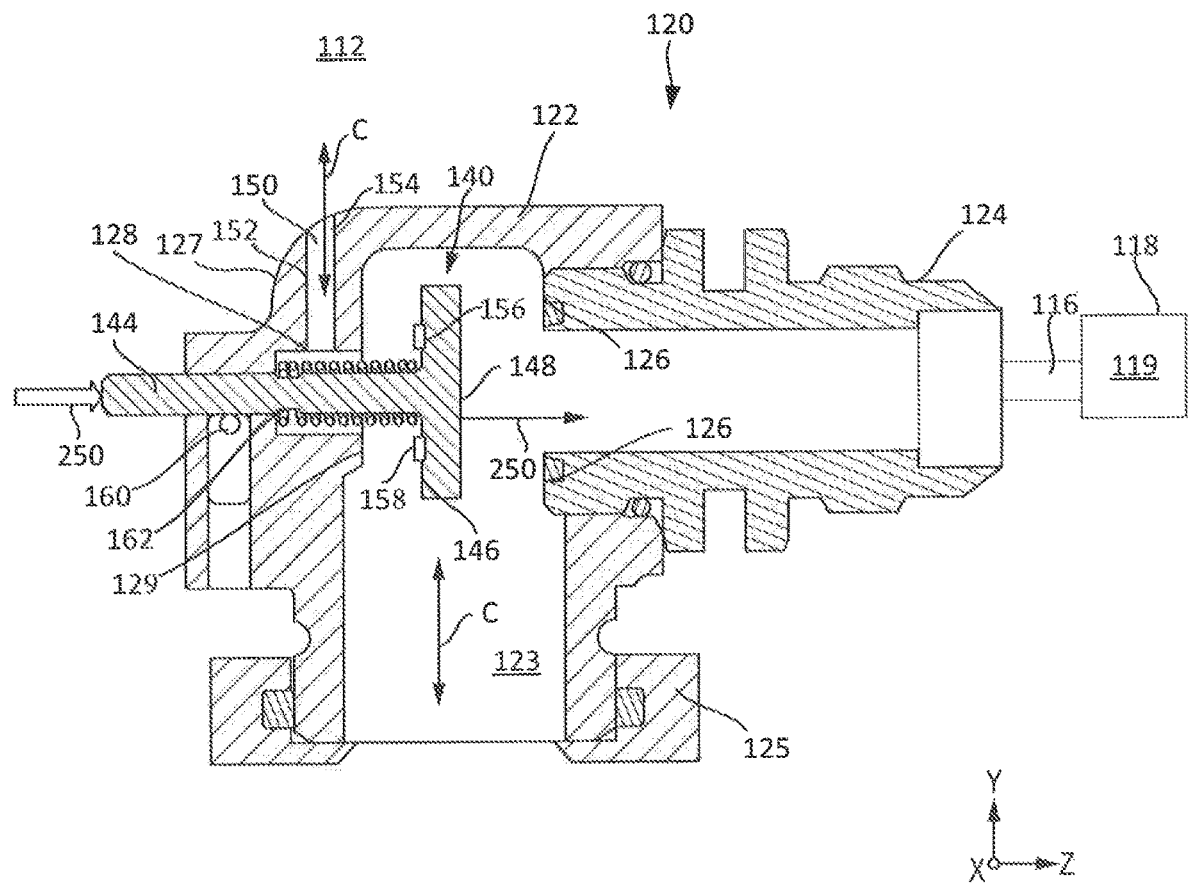
FIG. 5D illustrates a cross-sectional view of an aspirator air vent valve, in accordance with various embodiments.
Figure 6:
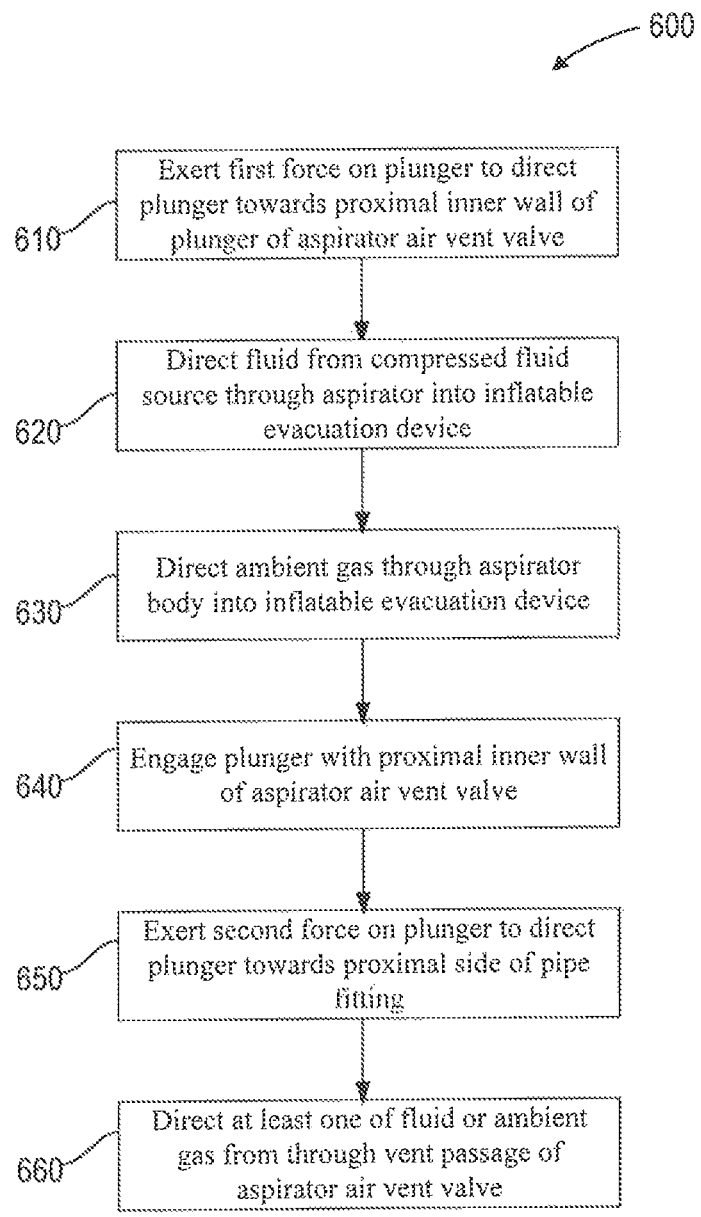
FIG. 6 illustrates a method of operating an aspirator, in accordance with various embodiments.

In various embodiments, and with reference to FIG. 5D, a second force 250 may be exerted on plunger 140 to translate plunger 140 in the positive z-direction, such that distal side 148 of head 142 translates towards proximal side 126 of pipe fitting 124. Second force 250 may be exerted manually on plunger 140. Indent 162 to disengage from detent pin 160 upon the application of force 250 on plunger 140. Second force 250 may direct plunger 140 away from the proximal inner wall 129 of the aspirator air vent valve 120. As plunger 140 disengages from proximal inner wall 129, vent passage 150 is in fluid communication with air vent valve air channel 123 and inflatable evacuation device 110, and allows for at least one of fluid 119 or ambient gas 112 to travel through vent passage 150 via airflow path C.

According to various embodiments, a method of operating an aspirator 600 is provided. The method of operating an aspirator 600 may comprise exerting a first force on a plunger of an aspirator air vent valve of the aspirator, wherein the first force directs the plunger towards a proximal inner wall of the aspirator air vent valve (step 610). The method of operating an aspirator 600 may comprise directing a fluid from a compressed fluid source through the aspirator into an inflatable evacuation device (step 620). The method of operating an aspirator 600 may comprise directing an ambient gas through an aspirator body into the inflatable evacuation device (step 630). The method of operating an aspirator 600 may comprise engaging the plunger with the proximal inner wall of the aspirator air vent valve (step 640). The method of operating an aspirator 600 may comprise exerting a second force on the plunger to direct the plunger towards a proximal side of a pipe fitting (step 650). The method of operating an aspirator 600 may comprise directing at least one of the fluid or the ambient gas from the inflatable evacuation device through a vent passage of the aspirator air vent valve (step 660).

Aspirator air vent valve 120 may be comprised of a lightweight, rigid material, such as aluminum, anodized aluminum, polyamide or other plastic, composite, or other suitable material. Aspirator air vent valve 120 may be formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating an aspirator arrangement, the method comprising: exerting a first force on a plunger of an aspirator air vent valve of the aspirator to direct the plunger towards a proximal inner wall of the aspirator air vent valve; engaging the plunger with the proximal inner wall of the aspirator air vent valve with the first force; and directing a fluid from a compressed fluid source through an air vent valve air channel defined by the aspirator air vent valve, through the aspirator, and into an inflatable evacuation device; wherein the first force moves the plunger from a first position to a second position; a vent passage extending between and to the proximal inner wall and an outer wall of the aspirator air vent valve is in fluid communication with the air vent valve air channel when the plunger is in the first position; and the vent passage is sealed from the air vent valve air channel by a sealing gasket coupled to a proximal side of a head of the plunger when the plunger is in the second position.

2. The method of claim 1, further comprising directing an ambient gas through an aspirator body into the inflatable evacuation device.

3. The method of claim 2, further comprising directing at least one of the fluid or the ambient gas from the inflatable evacuation device through the vent passage of the aspirator air vent valve.

4. The method of claim 1, further comprising exerting a second force on the plunger to direct the plunger towards a proximal side of a pipe fitting.

\* \* \* \* \*